United States Patent [19]
Gifkins

[11] Patent Number: 5,931,208
[45] Date of Patent: Aug. 3, 1999

[54] JIG FOR CUTTING DOVETAIL JOINTS

[76] Inventor: Roger Gifkins, 619 Belmore River Road, Kempsey, New South Wales 2440, Australia

[21] Appl. No.: 09/109,163

[22] Filed: Jun. 30, 1998

[30] Foreign Application Priority Data

Jul. 4, 1997 [AU] Australia .................................. PO7691

[51] Int. Cl.$^6$ .................................. B27F 1/14; B27M 3/00
[52] U.S. Cl. .......................... 144/145.2; 33/197; 33/562; 33/567.1; 144/87; 144/135.2; 144/144.51; 144/372; 409/130
[58] Field of Search .................................. 144/85, 87, 84, 144/135.2, 137, 144.1, 144.51, 145.1, 145.2, 371, 372; 409/125, 130, 182

[56] References Cited

U.S. PATENT DOCUMENTS

| | | | |
|---|---|---|---|
| 4,405,004 | 9/1983 | Dicke | 244/144.51 |
| 4,407,344 | 10/1983 | Dicke | 144/144.51 |
| 4,428,408 | 1/1984 | Grisley | 144/144.51 |
| 4,809,755 | 3/1989 | Pointikas | 144/145.2 |
| 4,875,510 | 10/1989 | Muellers | 144/145.2 |
| 5,018,562 | 5/1991 | Adams | 144/253.1 |

FOREIGN PATENT DOCUMENTS

| | | | |
|---|---|---|---|
| 423403 | 2/1911 | France | 144/145.2 |

*Primary Examiner*—W. Donald Bray
*Attorney, Agent, or Firm*—Ladas & Parry

[57] ABSTRACT

A jig for cutting dovetail joints includes a rigid template (1) attached to a block (4). A T-slot (6) along the top of the block locates a stop (8) which is used to align the edges of boards into which dovetail joints are to be cut. The rigid templates (1) includes a row of tapered fingers (2) and an opposing row of straight fingers (3). Shims (16) are used to adjust the position of a backing board (14) relative to the tapered fingers (2), thus providing adjustment in the fit of the dovetail joints. The device is adapted to be used in conjunction with a table-mounted router having a template follower or bearing fitted to the shank of the cutters.

9 Claims, 4 Drawing Sheets

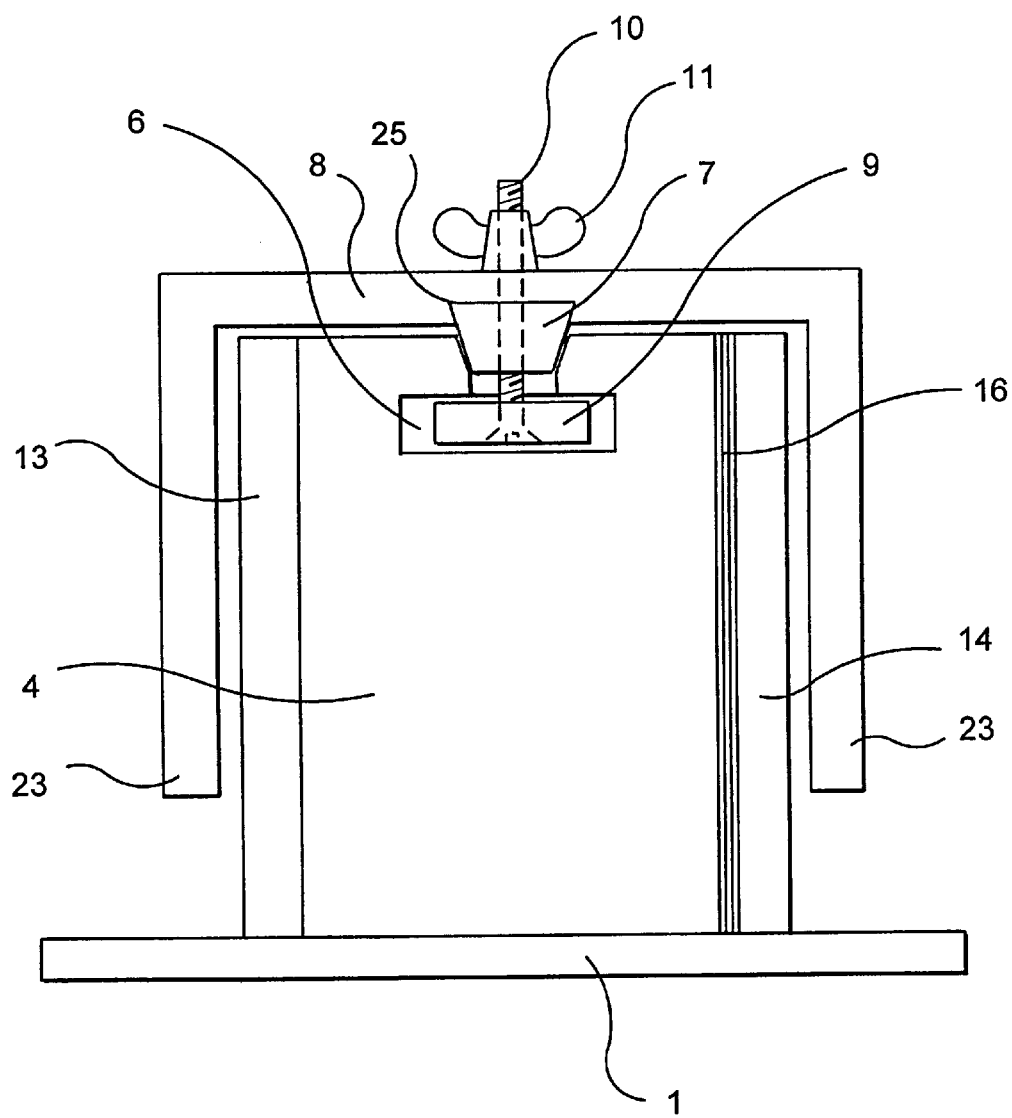
F I G. 3

JIG FOR CUTTING DOVETAIL JOINTS

FIELD OF THE INVENTION

The following invention relates to a device for cutting dovetail joints with a router. More particularly, though not exclusively, the invention relates to a jig designed to cut what are known as "through dovetail joints" as opposed to "half blind dovetail joints".

Jigs for cutting dovetail joints are known. However, some such known jigs do not readily lend themselves to the forming of accurately aligned dovetail slots and pins in mating work pieces. That is, careful, time-consuming alignment is necessary. Other such known jigs have no easy means to adjust how tight or loose the formed joint fits. This means that messy trial and error adjustments are required. Also, known dovetail jigs require that the router be handheld. This makes it necessary to hold the router perfectly flat on the jig whilst moving the router from finger to finger. Any movement of the router away from a perfectly flat disposition with respect to the fingers destroys the job being cut.

OBJECT OF THE INVENTION

It is the object of the present invention to overcome or substantially ameliorate at least one of the above disadvantages and/or more generally to provide an improved jig for cutting dovetail joints.

DISCLOSURE OF THE INVENTION

There is disclosed herein a dovetail cutting jig including:
a block;
a template affixed to the block and including a first array of fingers at one edge thereof and a second array of fingers at an opposite edge thereof,
a stop affixed to the block and slidably repositionable therealong, the stop being adapted to bear against respective work pieces clamped to the jig to enable alignment of dovetails and pins to be cut therein by a cutting tool projecting from a table upon which the jig is positioned in use.

Preferably, the fingers of the first array are aligned with spaces between the fingers of the second array.

Preferably, backing boards are secured to the block.

Preferably, shims are positioned between one of the backing boards and the block.

Preferably, the fingers of the first array of fingers are tapered.

Preferably, the fingers of the second array of fingers are straight.

Preferably, the jig further includes a slot formed in the block and into which a clamp block is positioned and wherein a bolt extends from the clamp block through the stop and a nut is threadedly engaged with the bolt.

Preferably, the jig further includes a tapered runner through which the bolt passes, the tapered runner cooperating with a tapered opening of the slot.

Preferably, a longitudinal ruler is marked upon the block.

BRIEF DESCRIPTION OF THE DRAWINGS

A preferred form of the present invention will now be described by way of example with reference to the accompanying drawings, wherein:

FIG. 3 is a schematic end elevational view of the jig of FIG. 1.

DESCRIPTION OF THE PREFERRED EMBODIMENT

Figure 1:
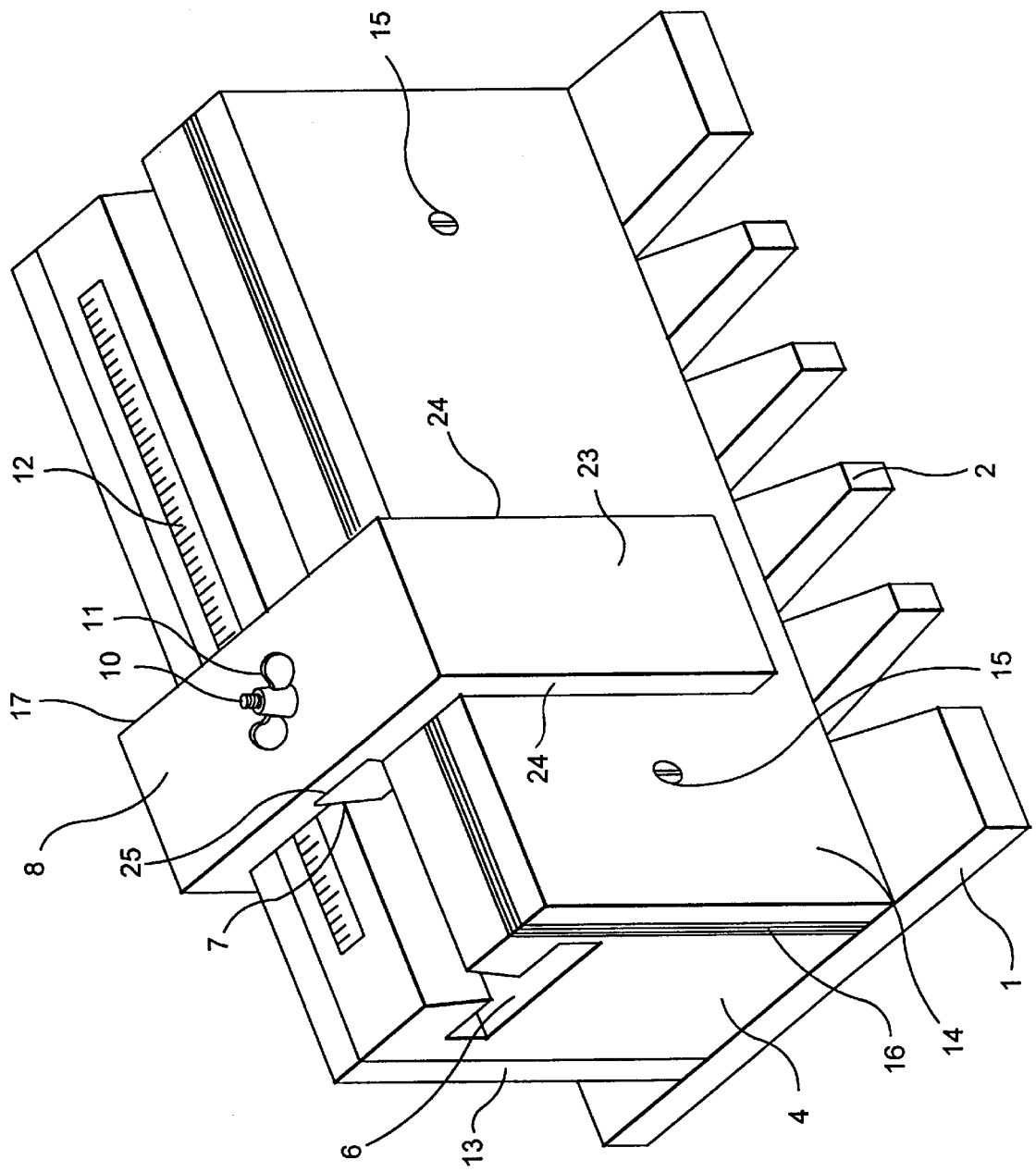
FIG. 1 is a schematic perspective view of a dovetail jig.
Figure 2:
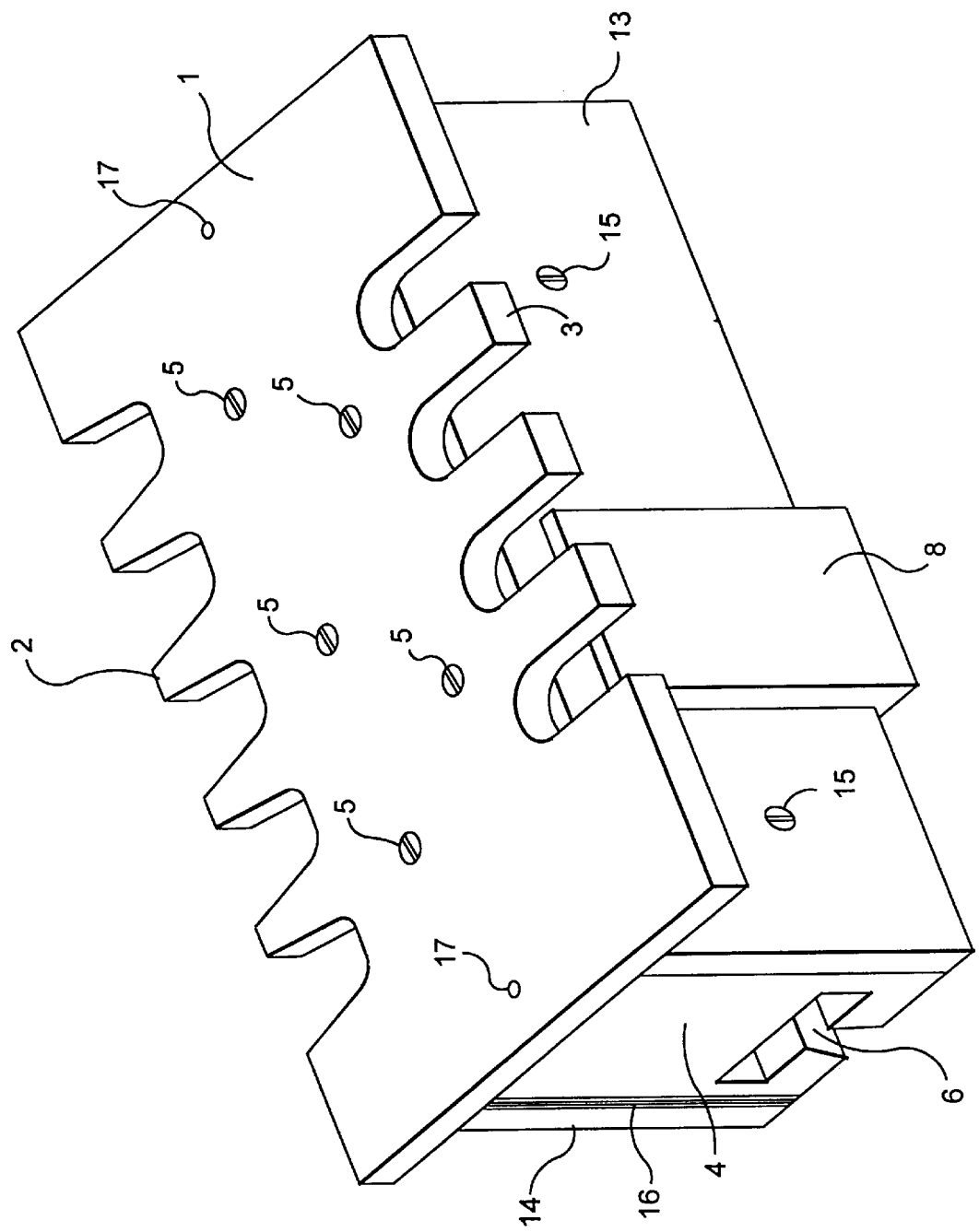
FIG. 2 is a schematic inverted perspective view of the dovetail jig of FIG. 1.
Figure 4:
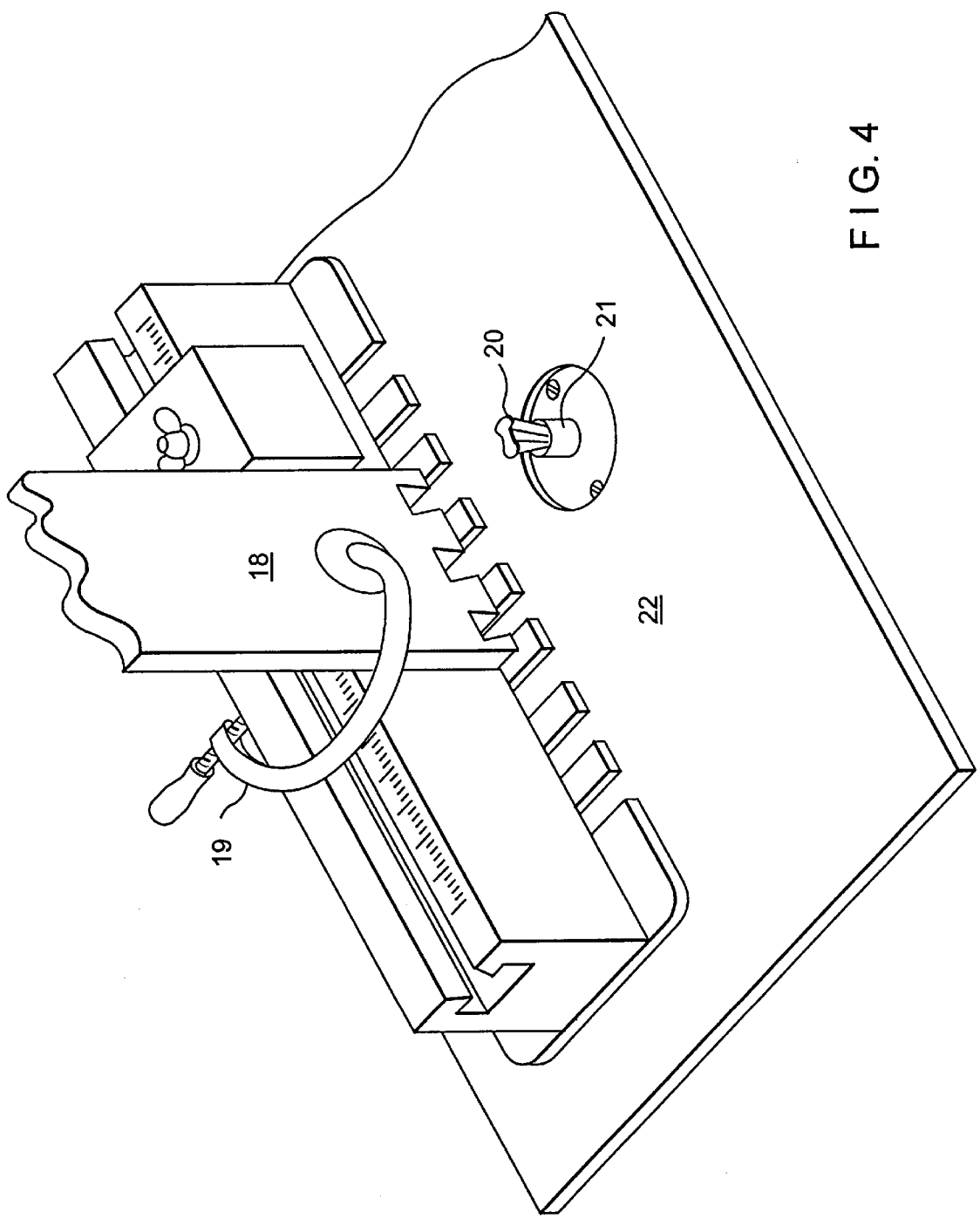
FIG. 4 is a schematic perspective view of the jig of FIG. 1 having a work piece clamped thereto.

In the accompanying drawings there is schematically depicted a jig for use in cutting dovetails and corresponding pins in wooden work pieces. The jig includes a template 1 which might be fabricated from metal, plastics, or other strong, rigid material. The template 1 includes an array of aligned tapered fingers 2 at one longitudinal edge thereof. At the other, opposed longitudinal edge, the template 1 includes an array of straight fingers 3. The tapered fingers 2 are positioned directly opposite the spaces between the straight fingers 3.

The template 1 is held by means of screws 5 to a central block 4 which is typically formed from wood. However, it should be noted that the central block 4 might be formed of plastics, metal or other suitably rigid material. The central block 4 has a pair of locating pins 17 projecting downwardly therefrom and each adapted to pass through corresponding holes which pas at least partially through the template 1, typically the whole way therethrough.

The central block 4 includes a longitudinal T-slot 6 below its upper surface. A clamp block 9 resides within the T-slot 6 and is adapted to move longitudinally of the block therein. A bolt 10 passes upwardly through the clamp block 9, through a tapered runner 7 and the upper surface of a stop 8. A wing nut or other form of nut 11 is threadedly associated with the bolt 10 and serves to tighten the block 8 upon the tapered runner 7 as clamp 9 is drawn upwardly against the upper, inside surface of the T-slot 6. As the tapered runner 7 is fitted into a recess 25 in the under surface of the stop 8, it is ensured that the stop 8 remains at right angles across the central block 4. The clamp block 9 and the tapered runner 7 are typically formed of wood. However, they might otherwise be fabricated from plastics, metal or other suitably rigid material. It should be appreciated that the tapered runner 7 has a taper corresponding to tapered surfaces formed at either side of the opening of the T-slot 6.

Attached to each side of the central block 4 by means of screws 15 is a pair of backing boards 13 and 14. One or more shims 16 can be placed between the backing board 14 and the central block 4. The shims 16 provide adjustment in the fit of the joint when cutting dovetails. Screws 15 serve to secure the backing boards 13 and 14 to the central block 4. The screws 15 which pas through the backing board 14 pass through corresponding apertures in the shims 16.

The stop 8 has a pair of downwardly depending legs 23, each having a pair of opposed edges 24 adapted to engage the side of a work piece 18 clamped by means of a G clamp 19 to the jig. A ruler 12 is marked in the upper surface of central block 4 as shown and serves the purpose of facilitating recording the position of the stop 8.

The dovetail jig can be used as follows. Firstly, the template follower 21 is fitted to the router associated with the table 22. Two alternative router cutters are to be used to cut the pins and dovetails. It should be noted that the size of the template follower 21 and the size and shape of the two router cutters is interdependent with the size and shape of the fingers 2 and 3 on the template 1. With the dovetail cutter 20 fitted to the router, the height of the cutter can be adjusted to the thickness of the stock plus the thickness of the template 1. The board into the ends of which dovetail slots are required is then stood on its end upon the straight fingers 3, with the inside of the job against the backing board 13. Sideways adjustment is then made to the required layout of the joint.

The work is then clamped with G clamp 19 to the jig. The stop 8 is then set against the side of the work and locked in place by tightening down of the wing nut 11. It is important that the stop 8 is not moved until both halves of the joint are finished. With the template 1 running against the template follower 21, the dovetail slots are cut. The other board requiring pins is then stood on its end above the tapered fingers 2, with the inside of the job against the backing board 14. The edge of the job is placed against the edge 24 of leg 23 of stop 8. The work is then securely clamped by G clamp 19. With a straight cutter in the router, the height of the cutter is adjusted to the thickness of the stock plus the thickness of the template 1. With the template 1 running against the template follower, the pins can be cut.

To cut a tighter fitting joint, shim 16 can be removed from behind the backing board 14 before cutting the pins. To a cut a looser fit joint, extra shims can be added before cutting the pins.

It should be appreciated that modifications and alterations obvious to those skilled in the art are not to be considered as beyond the scope of the present invention. For example, a variety of alternative templates 1 can be provided where different sized dovetail joints are needed. Furthermore, as an alternative to using a template follower when using the jig, a bearing fitted to the shank of the cutters can be employed.

I claim:

1. A dovetail cutting jig including:

a block, a template affixed to the block and including a first array of fingers at one edge thereof and a second array of fingers at an opposite edge thereof, a stop affixed to the block and slidably repositionable therealong, the stop being adapted to bear against respective work pieces clamped to the jig to enable alignment of dovetails and pins to be cut therein by a cutting tool projecting from a table upon which the jig is positioned in use.

2. The jig of claim 1 wherein the fingers of the first array are aligned with spaces between the fingers of the second array.

3. The jig of claim 1 wherein backing boards are secured to the block.

4. The jig of claim 3 wherein shims are positioned between one of the backing boards and the block.

5. The jig of claim 1 wherein the fingers of the first array of fingers are tapered.

6. The jig of claim 1 wherein the fingers of the second array of fingers are straight.

7. The jig of claim 1 further including a slot formed in the block and into which a clamp is positioned and wherein a bolt extends from the clamp block through the stop and a nut is threadedly engaged with the bolt.

8. The jig of claim 7 further including a tapered runner through which the bolt passes, the tapered runner cooperating with a tapered opening of the slot.

9. The jig of claim 1 including a longitudinal ruler marked upon the block.

* * * * *